Patented June 2, 1936

2,042,747

UNITED STATES PATENT OFFICE 2,042,747

SULPHONATED OXYGENATED COMPOUNDS OBTAINED BY CATALYTIC HYDROGENATION OF OXIDES OF CARBON

Heinrich Ulrich and Karl Saurwein, Ludwigshafen-on-the-Rhine, and Fritz Siefert, Mannheim, Germany, assignors to I. G. Farbenindustrie Aktiengesellschaft, Frankfort-on-the-Main, Germany No Drawing. Application August 29, 1932, Serial No. 630,906. In Germany September 23, 1931

6 Claims. (Cl. 260—99.12)

The present invention relates to the production of wetting agents for mercerizing liquors and such liquors containing the said agents.

In the British Patent No. 354,946 mercerizing liquors have been described which comprise acid sulphuric esters of aliphatic alcohols containing from 4 to 8 carbon atoms or their water-soluble salts and, if desired, organic, water-soluble hydroxyl-bearing compounds. It has also been proposed to produce water-soluble, soap-like washing, emulsifying and wetting agents by converting the mixtures of alcohols, boiling above 150° C. which may be obtained by the catalytic reduction of carbon monoxide and/or dioxide by means of hydrogen, or fractions of such mixtures, or single alcohols isolated therefrom, into sulphuric esters. These materials are completely soluble in water but insoluble in alkaline mercerizing liquors and do not give any substantial or lasting wetting effect in such liquors.

We have now found that very efficient wetting agents for mercerizing liquors can be obtained by reacting with sulphonating agents on the crude, oily products boiling between 120° and 160° C., obtained by the catalytic reduction of oxides of carbon by means of hydrogen, for example according to the processes described in the British Patents Nos. 229,714 and 238,319. These materials, serving as initial materials for the purpose of the present invention, consist of mixtures of various normal and branched aliphatic alcohols, containing generally from 4 to 7 carbon atoms, with some ketones, fatty acids and saturated and unsaturated hydrocarbons containing from about 5 to about 7 carbon atoms; a complete analysis of the non-alcoholic constituents was not possible owing to the most heterogeneous composition of the mixtures. The treating with sulphonating agents is effected in the usual manner while employing concentrated sulphuric acid, sulphuric acid monohydrate, oleum, sulphur trioxide, or preferably, chlorsulphonic acid. The treating with sulphonating agents is generally carried out at room temperature, but an elevated temperature such as 40° C., or 60° C., may also be employed, temperatures of or above 80° C. being preferably avoided in order to prevent any decomposition. About equal parts by weight of the initial material and of chlorsulphonic acid are generally employed, whereas twice the amount of concentrated sulphuric acid is used; the treating with sulphonating agents is carried out until the resulting product is soluble in a concentrated aqueous solution of caustic soda of say 30° Baumé strength, which is the case after about half an hour or 1 hour, if the treating with sulphonating agents be carried out at about 40° C., or after 1 to 3 hours if the reaction be effected at room temperature. In the treating with sulphonating agents, the aforesaid non-alcoholic constituents are apparently not attacked by the sulphonating agents to a substantial extent, about one fifth of the mixtures remaining water-insoluble as can be ascertained by analysis of the products obtained by treating with sulphonating agents after neutralizing the latter with sodium hydroxide or carbonate. These water-insoluble constituents are soluble in ethyl ether and can be extracted therewith from the neutralized products obtained by treating with sulphonaitng agents after the latter have been dissolved to from 20 to 30 per cent aqueous emulsions. If, however, the water-soluble sulphuric ester salts and the ethereal extracts, e. g. the water-insoluble matter be mixed again after their separation the resulting products have a far lower efficiency, or practically none, for the purposes desired. Similarly, mixtures, prepared by mixing the sulphuric ester salts with a mixture of non-sulphonated materials of the kind ascertained by analysis as far as possible, have equally no substantial and lasting wetting effect in alkaline mercerizing liquors.

Since the acid sulphuric esters in the oily products of the treating with sulphonating agents may decompose in contact with moist air the products are preferably neutralized as soon as possible with aqueous solutions of alkali metal hydroxides or carbonates, as for example with a 40 per cent aqueous solution of caustic soda or potash, or sodium or potassium carbonates. Depending on the temperature of the neutralized mass, inorganic salts may be precipitated which may be removed by filtration. Otherwise, remainders of sulphonating agent may be removed by precipitation with lime and filtration. In this manner oily products are obtained which contain, at the most, small quantities of alkali metal sulphates and yield milky emulsions with large quantities of water or aqueous pastes with say 20 per cent of their weight of water, owing to the insolubility of part of their constituents. They may be added directly to the alkaline mercerizing liquors in which they readily dissolve to form limpid solutions. From 3 to 10 grams, preferably about 5 grams, of the neutralized product are added to each liter of the mercerizing liquors, e. g. to an aqueous solution of caustic soda of from about 25° to about 32° Baumé strength.

The products have an excellent wetting power and completely avoid the formation of foam which is often injurious and which occurs when employing other wetting agents. Even after use of several days, the mercerizing liquors retain both wetting power and foam preventing power. A further advantage of the said wetting agents consists in the fact that they dissolve extremely readily in the concentrated alakaline liquors so that the employment of solvents is unnecessary. The said products are, moreover, non-poisonous and practically odorless.

The following example will further illustrate how this invention may be carried out in practice but the invention is not restricted to this example. The parts are by weight.

*Example*

100 parts of the fraction boiling between 120° and 160° C. of the oily product obtainable by the catalytic reduction of carbon monoxide with hydrogen according to the British Patents Nos. 229,714 or 238,319 are treated with 95 parts of chlorsulphonic acid at from 5° to 20° C., the hydrogen chloride thus formed being removed during or after the treating with chlorsulphonic acid by leading in a weak current of air. When a sample of the product completely dissolves in an aqueous solution of caustic soda of 30° Baumé strength the reaction is completed and the reaction product is stirred into 110 parts of an aqueous 25 per cent caustic soda solution; in this way an oily liquid is obtained, which contains about 60 per cent of active constituents.

5 grams of the said oily liquid are added to each liter of an aqueous solution of caustic soda of 30° Baumé strength. A cotton fabric which is treated with this mercerizing liquor shows a shrinkage effect of 25 per cent after one minute.

What we claim is:

1. The process for the production of wetting agents for alkaline mercerizing liquors, which comprises reacting a sulphonating agent at a temperature up to 80° C. with the fraction of oily products boiling between 120° C. and 160° C. of the products of the catalytic reduction of oxides of carbon by means of hydrogen.

2. The process for the production of wetting agents for alkaline mercerizing liquors, which comprises reacting a sulphonating agent at a temperature up to 80° C. with the fraction of oily products boiling between 120° and 160° C. of the products of the catalytic reduction of oxides of carbon by means of hydrogen, and neutralizing the resulting product with an alkali.

3. The process for the production of wetting agents for mercerizing liquors, which comprises reacting chlorsulphonic acid at from about 5° to about 20° C. with an about equal quantity of the fraction of oily products boiling between 120° and 160° C. of the products of the catalytic reduction of oxides of carbon by means of hydrogen.

4. The process for the production of wetting agents for mercerizing liquors, which comprises reacting chlorsulphonic acid at from about 5° to about 20° C. with an about equal quantity of the fraction of oily products boiling between 120° and 160° C. of the products of the catalytic reduction of oxides of carbon by means of hydrogen, and neutralizing the resulting product with caustic soda.

5. A difficultly water-soluble product obtained by treating with sulphonating agents the fraction of oily products boiling between 120° and 160° C. of the products of the catalytic reduction of oxides of carbon by means of hydrogen, which product contains sulphuric esters of alcohols contained in said oily products and is soluble in alkaline mercerizing liquors.

6. A neutralized difficultly water-soluble product obtained by treating with sulphonating agents the fraction of oily products boiling between 120° and 160° C. of the products of the catalytic reduction of oxides of carbon by means of hydrogen, which neutralized product contains alkali metal salts of sulphuric esters of alcohols contained in said oily products and is soluble in alkaline mercerizing liquors.

HEINRICH ULRICH.
KARL SAURWEIN.
FRITZ SIEFERT.